(12) United States Patent
Okamoto

(10) Patent No.: US 7,164,495 B1
(45) Date of Patent: Jan. 16, 2007

(54) METHOD OF CONVERTING IMAGE SIGNAL, METHOD OF DETERMINING ORIGINAL COLOR OF COLOR IMAGE, AND APPARATUS FOR CONVERTING IMAGE SIGNAL

(75) Inventor: Takahiro Okamoto, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 1061 days.

(21) Appl. No.: 09/662,900

(22) Filed: Sep. 15, 2000

(30) Foreign Application Priority Data

Sep. 16, 1999 (JP) ................................. 11-262440

(51) Int. Cl.
*G06F 15/00* (2006.01)
*G03F 3/08* (2006.01)
*G06K 9/00* (2006.01)

(52) U.S. Cl. ........................ 358/1.9; 358/523; 382/162
(58) Field of Classification Search ................ 358/1.9, 358/3.1, 3.3, 518, 523, 535, 534, 3.23; 382/167, 382/162
See application file for complete search history.

(56) References Cited

U.S. PATENT DOCUMENTS

| | | | | |
|---|---|---|---|---|
| 4,893,178 A | * | 1/1990 | Matama et al. ............. | 358/527 |
| 4,965,663 A | | 10/1990 | Sasaki | |
| 5,255,083 A | | 10/1993 | Capitant et al. | |
| 5,398,121 A | | 3/1995 | Kowalewski et al. | |
| 5,579,132 A | * | 11/1996 | Takahashi et al. .......... | 358/527 |
| 5,679,142 A | * | 10/1997 | McInerney et al. ........ | 106/31.6 |
| 5,987,168 A | * | 11/1999 | Decker et al. .............. | 382/167 |
| 6,045,895 A | * | 4/2000 | Hyde et al. ................. | 428/213 |
| 6,061,501 A | * | 5/2000 | Decker et al. .............. | 358/1.9 |
| 6,071,024 A | * | 6/2000 | Chi-Ming et al. ...... | 400/120.02 |
| 6,088,095 A | * | 7/2000 | Sharma ................... | 356/243.5 |
| 6,101,272 A | * | 8/2000 | Noguchi .................... | 382/167 |
| 6,137,594 A | * | 10/2000 | Decker et al. .............. | 358/1.9 |
| 6,278,533 B1 | | 8/2001 | Takemoto | |
| 6,281,984 B1 | * | 8/2001 | Decker et al. .............. | 358/1.9 |
| 6,313,925 B1 | * | 11/2001 | Decker et al. .............. | 358/1.9 |

FOREIGN PATENT DOCUMENTS

EP   0 454 275 A2   10/1991

(Continued)

OTHER PUBLICATIONS

Noboru Ohta; "Fundamentals of Color Reproduction Engineering"; published by Corona Co., Ltd.; Sep. 10, 1997; 1st edition; pp. 105-107.

(Continued)

Primary Examiner—Madeleine A V Nguyen
(74) Attorney, Agent, or Firm—Sughrue Mion, PLLC

(57) ABSTRACT

A new calibration scale is proposed for as a substitute for density values of a densitometer or equivalent neutral densities. A color reproduction range of a color reversal film is set on an xy chromaticity diagram. On the xy chromaticity diagram, there are established three straight lines passing through a chromaticity point corresponding to a standard white illuminant and principal wavelengths relative to primary colors R, G, B. Vertexes of a triangle containing the color reproduction range are determined on the three straight lines. Chromaticity values at the vertexes of said triangle are determined as primary colors R, G, B. Block dye density values c, m, y corresponding to the primary colors R, G, B are determined according to the equations $R=10^{-c}$, $G=10^{-m}$, $B=10^{-y}$. The determined block dye density values c, m, y are used as a new calibration scale. Since the block dye density values have properties similar to conventional density values as compared with colorimetric values, conventional image processing resources can be utilized.

3 Claims, 10 Drawing Sheets

FOREIGN PATENT DOCUMENTS

| | | |
|---|---|---|
| JP | 6-237373 | 8/1994 |
| JP | 6-261208 | 9/1994 |
| JP | 10-164378 | 6/1998 |

OTHER PUBLICATIONS

Gakuo Ikeda; "Fundamentals of Colorimetric Engineering"; published by Corona Co., Ltd.; Oct. 15, 1989; pp. 125-130.

M. Rodriguez: "A graphic arts perspective on RGB-to-CMYK conversion" Proceedings of the International Conference on Image Processing. (ICIP) Washington, Oct. 23-26, 1995, Los Alamitos, IEEE Comp. Soc. Press, US, vol. 3, Oct. 23, 1995, pp. 319-322, XP010197089.

* cited by examiner

METHOD OF CONVERTING IMAGE SIGNAL, METHOD OF DETERMINING ORIGINAL COLOR OF COLOR IMAGE, AND APPARATUS FOR CONVERTING IMAGE SIGNAL

BACKGROUND OF THE INVENTION

1. Field of the Invention

The present invention relates to a method of converting a device-dependent image signal produced by a color scanner (hereinafter referred to as "scanner"), a digital camera, etc., into a device-independent image signal, a method of determining an original color in a color reproduction range of a color image that is recorded on a color reversal film, and an apparatus for converting a device-dependent image signal into a device-independent image signal.

2. Description of the Related Art

For image processing, it has heretofore been customary to convert a device-dependent image signal produced by a scanner, which is an image input device, into a density value on a densitometer or an equivalent neutral density as disclosed in Japanese laid-open patent publication No. 6-237373 and Japanese laid-open patent publication No. 6-261208, and process an image signal represented by the density value or the equivalent neutral density, i.e., a density-based image signal, for sharpness, set-up, or color correction processing.

In recent years, there has been established a standard color management technique for converting a device-dependent image signal produced by a scanner, a digital camera, etc., which is an image input device, into a device-independent image signal representing calorimetric values X, Y, Z or L*, a*, b*, processing the device-independent image signal, and then converting the processed device-independent image signal into a device-dependent image signal for use by a printing press, a printer, or a display monitor.

However, the image processing process which processes the device-independent image signal based on the colorimetric values fails to utilize the image processing technique that uses density-based image signals as conventional image processing resources.

SUMMARY OF THE INVENTION

It is therefore an object of the present invention to provide a method of converting a device-dependent image signal into a novel device-independent image signal, which replaces density values on a densitometer or equivalent neutral densities or colorimetric values, a method of determining an original color of a color image, and an apparatus for converting a device-dependent image signal into a device-independent image signal.

According to an aspect the present invention, there is provided a method of converting device-dependent image signals into device-independent image signals, comprising the step of converting device-dependent image signals into device-independent image signals representing densities (density values or density scale) with block dyes. Since the device-independent image signals representing densities with block dyes have properties similar to conventional density values and equivalent neutral density values, they can be handled with ease, e.g., they have excellent organoleptic properties. The device-independent image signals can highly accurately be converted into colorimetric values through simple calculations.

According to another aspect of the present invention, there is also provided a method of converting device-dependent image signals into device-independent image signals, comprising the steps of converting device-dependent image signals supplied from an input device which reads an image subject into device-independent image signals representing densities with block dyes, and converting the device-independent image signals into device-dependent image signals for an output device.

The device-dependent image signals may comprise R, G, B signals or C, M, Y signals, and the device-independent image signals may comprise C, M, Y signals representing densities with block dyes. Therefore, R, G, B signals and C, M, Y signals outputted from an image input device such as a digital camera, a scanner, or the like may be handled as C, M, Y signals representing densities with block dyes.

According to still another aspect of the present invention, there is further provided a method of determining primary colors of a color image, comprising the steps of setting a color reproduction range of the color image on an xy chromaticity diagram, setting three straight lines extending through a chromaticity point corresponding to a standard white illuminant on the xy chromaticity diagram and principal wavelengths relative to primary colors in the color reproduction range, determining the vertexes of a triangle containing the color reproduction range on the three straight lines, and determining choromaticity values at the vertexes of the triangle as primary colors. Density values of block dyes can be calculated from the determined primary colors.

The color image may be carried on a color reversal film or a reflective color print.

According to yet another aspect of the present invention, there is further provided an apparatus for converting device-dependent image signals into device-independent image signals, comprising an input converter for converting device-dependent image signals into device-independent image signals representing densities with block dyes.

With the above apparatus, because the device-independent image signals representing densities with block dyes have properties similar to conventional density values and equivalent neutral density values, they can be handled with ease, e.g., they have excellent organoleptic properties. The device-independent image signals can highly accurately be converted into calorimetric values through simple calculations.

According to yet still another aspect of the present invention, there is provided an apparatus for converting device-dependent image signals into device-independent image signals, comprising an input converter for converting device-dependent image signals supplied from an input device which reads an image subject into device-independent image signals representing densities with block dyes, and an out-put converter for converting the device-independent image signals into device-dependent image signals for an output device.

In the above apparatus, the device-dependent image signals may comprise R, G, B signals or C, M, Y signals, and the device-independent image signals may comprise C, M, Y signals representing densities with block dyes. Therefore, R, G, B signals and C, M, Y signals outputted from an image input device such as a digital camera, a scanner, or the like may be handled as C, M, Y signals representing densities with block dyes.

According to a further aspect of the present invention, there is provided an apparatus for converting device-dependent image signals into device-independent image signals, comprising a plurality of one-dimensional conversion tables for processing device-dependent image signals supplied from an input device which reads an image subject, with respective predetermined functions, a table selector for selecting one of the one-dimensional conversion tables which is optimum for the input device, and an input converter for converting the device-dependent image signals processed by the one-dimensional conversion table which is selected by the table selector, into device-independent image signals representing densities with block dyes. One of the one-dimensional conversion tables can be selected depending on the input device, which may comprise a digital camera, a scanner, or the like. Thus, the obtained device-independent image signals representing densities with block dyes well match the device-dependent image signals supplied from the input device.

The table selector may comprise means for using block dye densities determined from a reference color chart as target values, means for processing, as input values, image signals which are produced by reading the reference color chart with the input device and processed by the one-dimensional conversion tables, according to a predetermined polynomial, thereby to produce calculated values, and means for selecting one of the one-dimensional conversion tables which outputs the input values corresponding to those of the calculated values which are closest to the target values, as the one-dimensional conversion table which is optimum for the input device.

The predetermined polynomial may comprise a polynomial based on a regression analysis.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Prior to describing embodiments of the present invention, block dyes and the relationship of conversion between the block dyes and colorimetric values will be described below for an easier understanding of the embodiments of the present invention.

Block dyes are described in "Fundamentals of color reproduction engineering", written by Noboru Ohta, published by Corona Co., Ltd., Sep. 10, 1997, 1st edition, 1st printing, pages 105–107 (hereinafter referred to as "literature 1").

Figure 1:
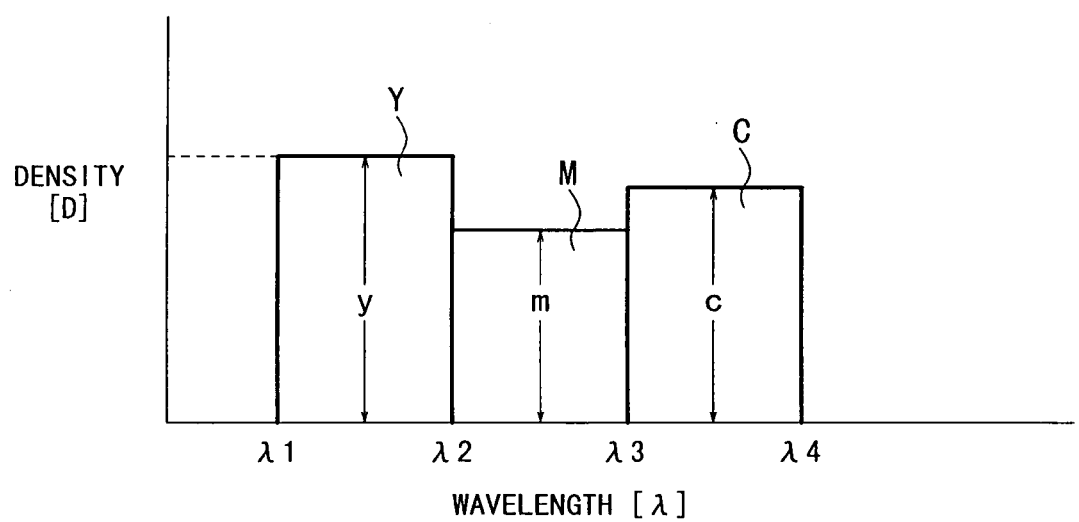
FIG. 1 is a diagram illustrative of block dyes.

Block dyes are dyes whose spectral absorption curves are of block shape. As shown in FIG. 1, a block dye Y (yellow) has a density (also referred to as "density value" or "density scale") D having a uniform density value y (D=y) between wavelengths $\lambda 1$ and $\lambda 2$. A block dye M (magenta) has a density D having a uniform density value m (D=m) between wavelengths $\lambda 2$ and $\lambda 3$. A block dye C (cyan) has a density D having a uniform density value c (D=c) between wavelengths $\lambda 3$ and $\lambda 4$. As well known in the art, the density D can be expressed by the following equation (1):

$$D = -\log_{10} T \leftarrow \rightarrow T = 10^{-D} \qquad (1)$$

where T ($\lambda$) represents spectral transmittance.

According to the present invention, the density values c, m, y of the block dyes C, M, Y which express the colors of a color image (subject) recorded on a color reversal film, a reflective color print, etc. are density values converted (calibrated) into a novel device-dependent image signal which replaces density values on a densitometer or equivalent neutral densities or colorimetric values.

The wavelength ranges of the block dyes C, M, Y do not need to share a wavelength between the block dyes Y, M or between the block dyes M, C, as shown in FIG. 1. Rather, the wavelength ranges of the block dyes Y, M or the block dyes M, C may overlap each other, or may be spaced from each other by a wavelength gap therebetween.

A colorimetric value X is expressed by the equation (2), and can be developed according to the equations (3), (4) in view of the above properties of the block dyes C, M, Y.

$$X = \int T(\lambda) \cdot P(\lambda) \cdot x(\lambda) d\lambda \qquad (2)$$

$$= 10^{-c} \int P(\lambda) \cdot x(\lambda) d\lambda$$

$$+ 10^{-m} \int P(\lambda) \cdot x(\lambda) d\lambda$$

$$+ 10^{-y} \int P(\lambda) \cdot x(\lambda) d\lambda \qquad (3)$$

$$= 10^{-c} \cdot Xr + 10^{-m} \cdot Xg + 10^{-y} \cdot Xb \qquad (4)$$

In the equation (2), the range of the integral $\int$ represents the visible wavelength range. In the equation (3), the range of the integral $\int$ of the first term on the right side represents the range between $\lambda 3$ and $\lambda 4$, the range of the integral $\int$ of the second term of the right side represents the range between $\lambda 2$ and $\lambda 3$, and the range of the integral $\int$ of the third term of the right side represents the range between $\lambda 1$ and $\lambda 2$.

In the equation (4), Xr, Xg, Xb represent Xr=$\int P(\lambda) \cdot x(\lambda) d\lambda$ (the range of the integral $\int$ represents the range between $\lambda 3$ and $\lambda 4$), Xg=$\int P(\lambda) \cdot x(\lambda) d\lambda$ (the range of the integral $\int$ represents the range between $\lambda 2$ and $\lambda 3$), Xb=$\int P(\lambda) \cdot x(\lambda) d\lambda$ (the range of the integral $\int$ represents the range between $\lambda 1$ and $\lambda 2$), respectively.

Therefore, the block dyes C, M, Y can easily be converted into calorimetric values X, Y, Z by matrix and product sum operations, rather than integral operations, according to the following matrix equation (5):

$$\begin{bmatrix} X \\ Y \\ Z \end{bmatrix} = \begin{bmatrix} X_r & X_g & X_b \\ Y_r & Y_g & Y_b \\ Z_r & Z_g & Z_b \end{bmatrix} \begin{bmatrix} 10^{-c} \\ 10^{-m} \\ 10^{-y} \end{bmatrix} \quad (5)$$

Since the colorimetric values X, Y, Z and colorimetric values L*, a*, b* can uniquely be converted between each other according to colorimetric equations, the term "colorimetric values" used herein represent either the X, Y, Z values or the L*, a*, b* values.

The elements of the matrixes according to the equation (5) can be determined irrespective of wavelengths, as described below.

It is assumed that primary colors (which may actually include imaginary primary colors that do not exit) R, G, B are equal to the transmittances $10^{-c}$, $10^{-m}$, $10^{-y}$, respectively, of the block dyes C, M, Y in the equation (5), as indicated by the following equation (6):

$$R=10^{-c}, G=10^{-m}, B=10^{-y} \quad (6)$$

By substituting the equation (6) in the equation (5), the following equation (7) is obtained:

$$\begin{bmatrix} X \\ Y \\ Z \end{bmatrix} = \begin{bmatrix} X_r & X_g & X_b \\ Y_r & Y_g & Y_b \\ Z_r & Z_g & Z_b \end{bmatrix} \begin{bmatrix} R \\ G \\ B \end{bmatrix} \quad (7)$$

According to the equation (7), the subtractive mixture of the block dyes C, M, Y can be replaced with the additive mixture, and hence can be handled in the same manner as the additive mixture.

Therefore, if imaginary primary color R, G, B values with respect to a color image recorded on a color reversal film or the like are initially determined, then density values c, m, y of imaginary block dyes C, M, Y corresponding to the primary color R, G, B values can be estimated, i.e., calculated, from the primary color R, G, B according to the equation (6).

In the embodiments described below, imaginary primary color R, G, B values are initially determined, and then density values c, m, y of imaginary block dyes C, M, Y corresponding to the primary color R, G, B values are determined. A process of determining the elements Xr, Xg, Xb, Yr, Yg, Yb, Zr, Zg, Zb of the matrix according to the equation (7) when the primary color R, G, B values are initially determined is disclosed in "Fundamentals of colorimetric engineering", written by Gakuo Ikeda, published by Corona Co., Ltd., Oct. 15, 1989, 6th printing, pages 125–130 (hereinafter referred to as "literature 2").

The process of determining the elements Xr, Xg, Xb, Yr, Yg, Yb, Zr, Zg, Zb will be described below.

A general formula for converting primary color R, G, B values into calorimetric values X, Y, Z is given by the following equation (8):

$$\begin{bmatrix} R \\ G \\ B \end{bmatrix} = \begin{bmatrix} R_X & R_Y & R_Z \\ G_X & G_Y & G_Z \\ B_X & B_Y & B_Z \end{bmatrix} \begin{bmatrix} X \\ Y \\ Z \end{bmatrix} \quad (8)$$

In the equation (8), the values of the matrix elements $R_X$, $R_Y$, $R_Z$, $G_X$, $G_Y$, $G_Z$, $B_X$, $B_Y$, $B_Z$, i.e. the coefficients of the elements X, Y, Z of the right matrix on the right side, can be determined by specifying x, Y chromaticity values of the primary colors R, G, B on the left side and x, Y chromaticity values of a standard illuminant (white) according to the CIE, as described in the above pages of the literature 2.

The equation (8) can be modified into the following equation (9):

$$\begin{bmatrix} X \\ Y \\ Z \end{bmatrix} = \begin{bmatrix} R_X & R_Y & R_Z \\ G_X & G_Y & G_Z \\ B_X & B_Y & B_Z \end{bmatrix}^{-1} \begin{bmatrix} R \\ G \\ B \end{bmatrix} \quad (9)$$

If the left inverse matrix on the right side of the equation (9) and the left matrix on the right side of the equation (7) are made equal to each other as shown by the equation (10) below, then the elements Xr, Xg, Xb, Yr, Yg, Yb, Zr, Zg, Zb of the matrixes according to the equation (7) when the primary color R, G, B values are initially determined can be determined.

$$\begin{bmatrix} X_r & X_g & X_b \\ Y_r & Y_g & Y_b \\ Z_r & Z_g & Z_b \end{bmatrix} = \begin{bmatrix} R_X & R_Y & R_Z \\ G_X & G_Y & G_Z \\ B_X & B_Y & B_Z \end{bmatrix}^{-1} \quad (10)$$

The block dyes and the relationship of conversion between the block dyes and colorimetric values have been described above.

Now, an image processing system 10 according to the present invention will be described below.

Figure 2:
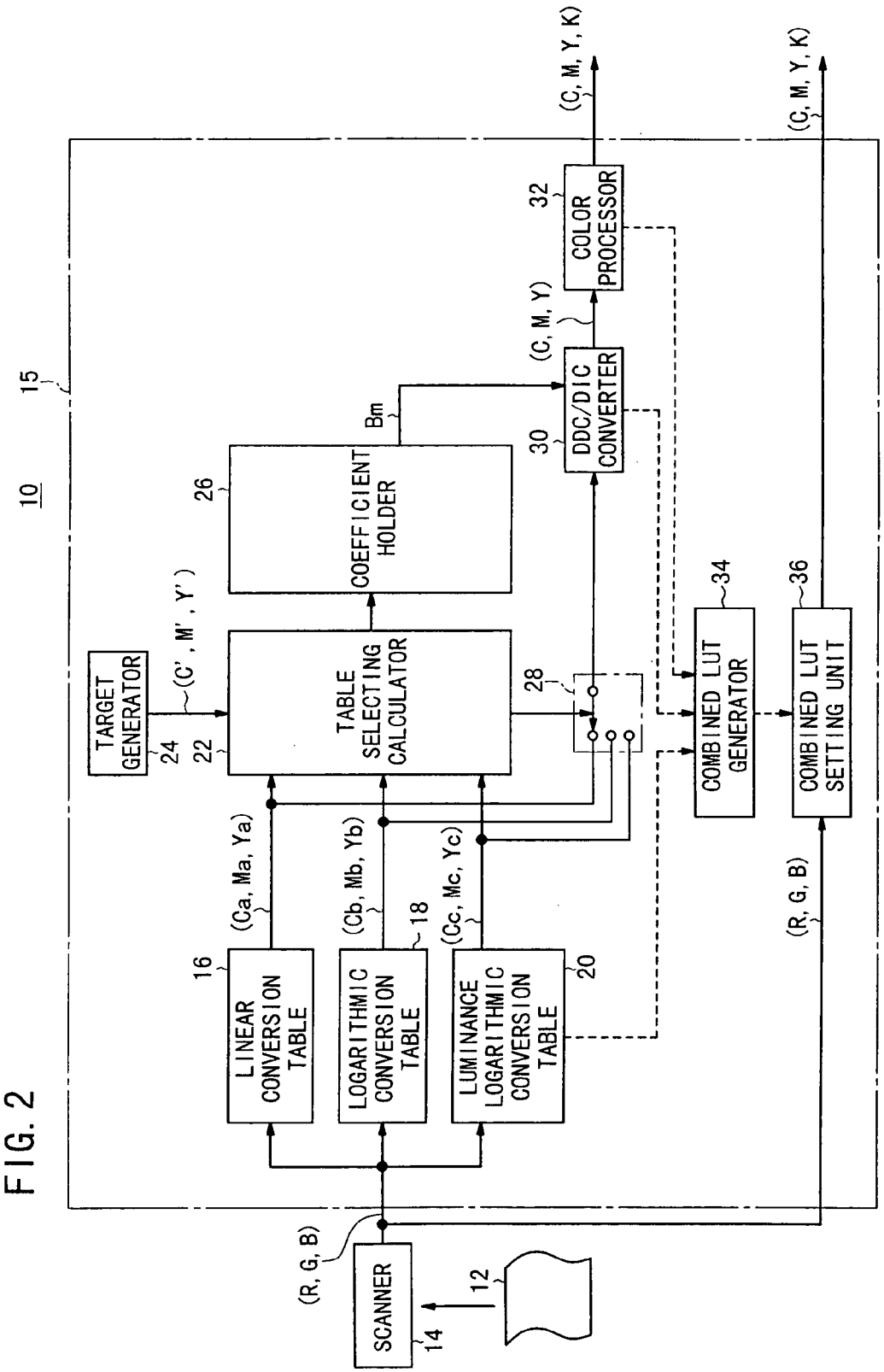
FIG. 2 is a block diagram of an image processing system according to the present invention.

FIG. 2 shows in block form the image processing system 10.

As shown in FIG. 2, the image processing system 10 basically comprises a scanner 14 as an image input device (also referred to as "image reading devices" or "image input device"), and an image processor 15 connected to the scanner 14.

The scanner 14 scans a color reversal film 12 as a subject with an optical system, and outputs device-dependent image signals (R, G, B) representing color-separated pixel signals to the image processor 15.

The image processor 15 converts the device-dependent image signals (R, G, B) from the scanner 14 into device-dependent image signals (C, M, Y, K), for example, for printing.

The image processor 15 comprises a computer for carrying out a series of calculations or a data processing sequence according to a program. Specifically, the image processor 15 comprises a computer unit having a CPU, a memory, etc., an input device including a mouse, a keyboard, etc. connected to the computer unit, and a display unit such as a CRT display or the like connected to the computer unit.

The image processor 15 has a linear conversion table (also referred to as "one-dimensional LUT") 16 as a one-dimensional LUT (Look-Up Table) for converting the device-dependent image signals (R, G, B) from the scanner 14 into image signals (C, M, Y)=(Ca, Ma, Ya) as intermediate values, a logarithmic conversion table (also referred to as "one-dimensional LUT") 18 as a one-dimensional LUT for converting the device-dependent image signals (R, G, B) from the scanner 14 into image signals (C, M, Y)=(Cb, Mb, Yb) as intermediate values, and a luminance logarithmic conversion table (also referred to as "one-dimensional LUT") 20 as a one-dimensional LUT for converting the device-dependent image signals (R, G, B) from the scanner 14 into image signals (C, M, Y)=(Cc, Mc, Yc) as intermediate values.

These one-dimensional LUTs 16, 18, 20 are tables inserted for either converting signals which cannot easily be approximated by a polynomial, described later on, according to predetermined functions thereby to increase the accuracy of approximation by the polynomial, or reducing the number of terms of the polynomial if the accuracy of approximation may remain unchanged.

The linear conversion table 16 has a function to linearly convert the supplied image signals (R, G, B) according to respective linear equations.

The logarithmic conversion table 18 has a function to logarithmically convert the image signals obtained as luminance signals into image signals as density signals.

The luminance logarithmic conversion table 20 has a function to convert an L* value in the CIELAB color space into a luminance and thereafter logarithmically convert the luminance.

The image signals (Ca, Ma, Ya), (Cb, Mb, Yb), (Cc, Mc, Yc) as intermediate values outputted respectively from the one-dimensional LUTs 16, 18, 20 are supplied to a table selecting calculator 22 for selecting either one of the one-dimensional LUTs 16, 18, 20.

The table selecting calculator 22 performs given calculations using block dye density values (C', M', Y') generated by a target generator 24 as target values, selects one of the one-dimensional LUTs 16, 18, 20 which outputs image signals closest to the target values when the table selecting calculator 22 calculates the polynomial using the image signals (Ca, Ma, Ya), (Cb, Mb, Yb), (Cc, Mc, Yc) as intermediate values, switches a table selector 28 which comprises a multiplexer, and holds coefficients Bm of the determined polynomial in a coefficient holder 26 as a memory.

The image processor 15 also has a DDC (Device-Dependent Color)/DIC (Device-Independent Color) converter 30 as a polynomial calculator for converting device-dependent image data into device-independent image data. The DDC/DIC converter 30 converts the device-dependent image signals from one of the one-dimensional LUTs 16, 18, 20 which has been selected by the table selector 28, into block dye density values (C, M, Y) as device-independent image signals according to a given polynomial whose cofficients Bm are supplied from the coefficient holder 26.

The block dye density values (C, M, Y) are then converted by a color processor 32 into device-dependent image signals (C, M, Y, K) as halftone dot % (halftone dot area ratio) signals if the output device (image output device) comprises a printing press, for example.

In the image processor 15, as described above, the device-dependent image signals (R, G, B) outputted from the scanner 14 via one of the one-dimensional LUTs 16, 18, 20 and the table selector 28 to the DDC/DIC converter 30, and then converted into device-dependent image signals (C, M, Y, K) for printing by the DDC/DIC converter 30 and the color processor 32.

Actually, when the device-dependent image signals (R, G, B) outputted from the scanner 14 or the like are supplied to the image processor 15, the table selecting calculator 22 selects the signals from one of the one-dimensional LUTs 16, 18, 20 which approximate the block dye density values (C', M', Y') as target values most accurately. Thereafter, a combined LUT generator 34 combines or merges the selected one of the one-dimensional LUTs 16, 18, 20, the DDC/DIC converter 30, and the color processor 32 into a combined LUT, and stores the combined LUT into a combined LUT setting unit 36 as a memory. The device-dependent image signals (R, G, B) outputted from the scanner 14 is converted into the device-dependent image signals (R, G, B) for printing, by the device-dependent image signals (R, G, B) stored in the combined LUT setting unit 36, i.e., one LUT.

The coefficient holder 26 is required to comprise an electrically erasable programmable ROM such as a flash memory or the like. The combined LUT setting unit 36 may comprise a RAM such as a volatile memory incorporated as a working memory in the computer.

The components of the image processor 15 which range from the one-dimensional LUTs 16, 18, 20 to the DDC/DIC converter 30 perform an input converting process, the color processor 32 performs an output converting process.

The color processor 32 which performs an output converting process will be described as to its arrangement and operation in detail below. The color processor 32 generates a density signal K based on the setting of densities including highlights (HL) and shadows (SD), the gradation conversion for each color, the adjustment of the gray balance, color correction, and UCR (Under Color Removal) according to image processing conditions that are specified by the operator using input device including a mouse, a keyboard, etc. The color processor 32 may be arranged as shown in FIG. 3, for example.

Figure 3:
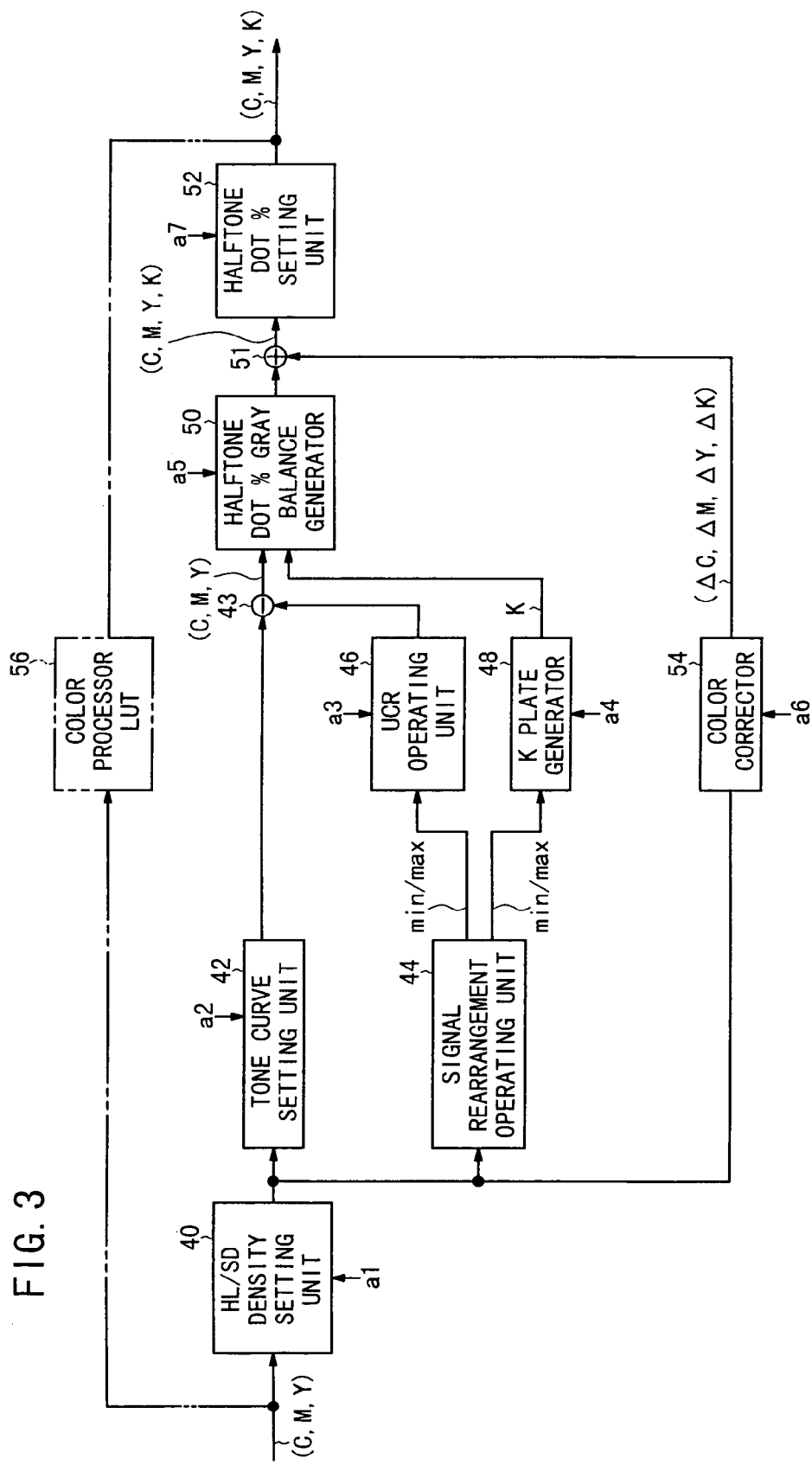
FIG. 3 is a detailed block diagram of a color processor in the image processing system shown in FIG. 2.

As shown in FIG. 3, the color processor 32 comprises an HL/SD density setting unit 40, a tone curve setting unit 42, a signal rearrangement operating unit 44, a UCR operating unit 46, a K plate generator 48, a halftone dot % gray balance generator 50, a halftone dot % setting unit 52, and a color corrector 54. The color processor 32 generates and outputs color-processed device-dependent image signals (C, M, Y, K) based on instruction data a1–a7 supplied from the operator via the input device to the various components 40, 42, 46, 48, 50, 54, 52, and the block dye density values (block dye density value signals) (C, M, Y) as device-independent image signals outputted from the DDC/DIC converter 30 (see FIG. 2) and supplied to the HL/SD density setting unit 40.

The HL/SD density setting unit 40 normalizes the densities at the highlight and shadow setting points of the supplied block dye density values (C, M, Y) with the density setting values of the instruction data a1 relative to the output device.

The tone curve setting unit 42 selects a basic tone curve as one of image conversion functions based on the instruction data a2, or sets a tone curve by correcting the basic tone curve with a curve correction coefficient indicated by the instruction data a2. The tone curve setting unit 42 converts the gradations of the image signals (C, M, Y) normalized by the HL/SD density setting unit 40 with respect to the image signal C relative to cyan according to the set tone curve.

The signal rearrangement operating unit 44 compares the magnitudes of the image signals (C, M, Y) from the HL/SD density setting unit 40 to determine a maximum value max and a minimum value min.

The UCR operating unit 46 calculates a UCR quantity with respect to the image signals (C, M, Y) according to the maximum value max and the minimum value min from the signal rearrangement operating unit 44 and gray width control data and UCR intensity data based on the instruction data a3. The UCR quantity is subtracted from the image signals (C, M, Y) prior to the UCR process by a subtractor 43. If the UCR process is replaced with a UCA (Under Color Addition) process, then the UCR intensity data may be set to a negative value, and the obtained UCR quantity may be added to the image signals (C, M, Y) prior to the UCA process.

The K plate generator 48 calculates an image signal K according to the maximum value max and the minimum value min from the signal rearrangement operating unit 44 and K plate gray width control data and K plate generating curve correcting coefficient data based on the instruction data a4.

The halftone dot % gray balance generator 50 converts the image signals (C, M, Y) into halftone dot % signals (C, M, Y), which turn the image signals (C, M, Y) into gray signals, and also converts the image signal K into a halftone dot % signal K, according to gray balance data based on the instruction data a5.

The color corrector 54 determines hue signals, lightness signals, and chroma signals from the image signals (C, M, Y) supplied from the HL/SD density setting unit 40, and determines corrective quantities $\Delta C$, $\Delta M$, $\Delta Y$, $\Delta K$ for the image signals (C, M, Y, K) as halftone dot % according to correction coefficients based on the instruction data a6. The corrective quantities $\Delta C$, $\Delta M$, $\Delta Y$, $\Delta K$ are then added respectively to the halftone dot % signals (C, M, Y, K) out-putted from the halftone dot % gray balance generator 50 by an adder 51.

The halftone dot % setting unit 52 further corrects the halftone dot % signals (C, M, Y, K) to which the corrective quantities $\Delta C$, $\Delta M$, $\Delta Y$, $\Delta K$ have been added, according to highlight and shadow halftone dot % setting values based on the instruction data a7.

The color processor 32 converts the device-independent image signals (C, M, Y) supplied to the HL/SD density setting unit 40 into the device-dependent image signals (C, M, Y, K) outputted from the halftone dot % setting unit 52.

Therefore, the color processor 32 which operates in the manner described above converts the block dye density values (C, M, Y) supplied as device-independent image signals from the are DDC/DIC converter 30 into the device-dependent half-tone dot % signals (C, M, Y, K). The color processor 32 may be constructed as a single look-up table representing the relationship of conversion between the block dye density values (C, M, Y) and the halftone dot % signals (C, M, Y, K). The look-up table thus constructed is indicated as a color processing LUT 56 by the two-dot-and-dash line in FIG. 3.

Figure 4:
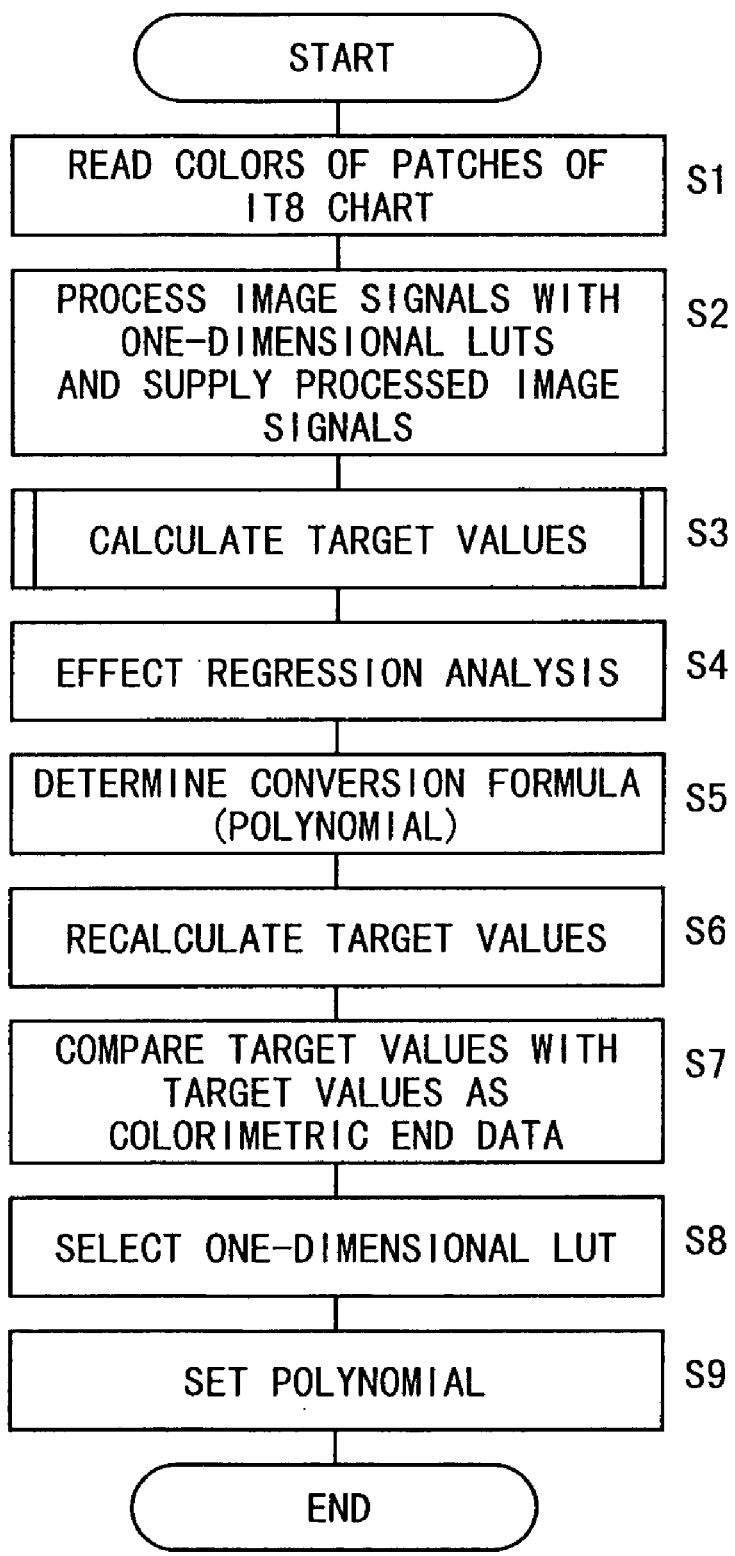
FIG. 4 is a flowchart of an operation sequence of the image processing system shown in FIG. 2.

A process of determining the coefficients Bm of the polynomial for converting the device-dependent image signals outputted from the input device such as the scanner 14 or the like into the device-independent image signals with high accuracy, a process of selecting an optimum one of the one-dimensional LUTs 16, 18, 20 used to determine the coefficients Bm of the polynomial, and the input converting process of converting the device-dependent image signals into the device-independent image signals will be described below with reference to FIG. 4.

In step S1 shown in FIG. 4, the scanner 14 scans and reads an ANSI/IT8.7/1–1993 chart (hereinafter referred to as "IT8 chart") CT for color reversal films, as an input color target according to the ANSI (American National Standard Institute) to obtain device-dependent image signals (R, G, B) for each of patches of the IT8 chart CT.

Figure 5:
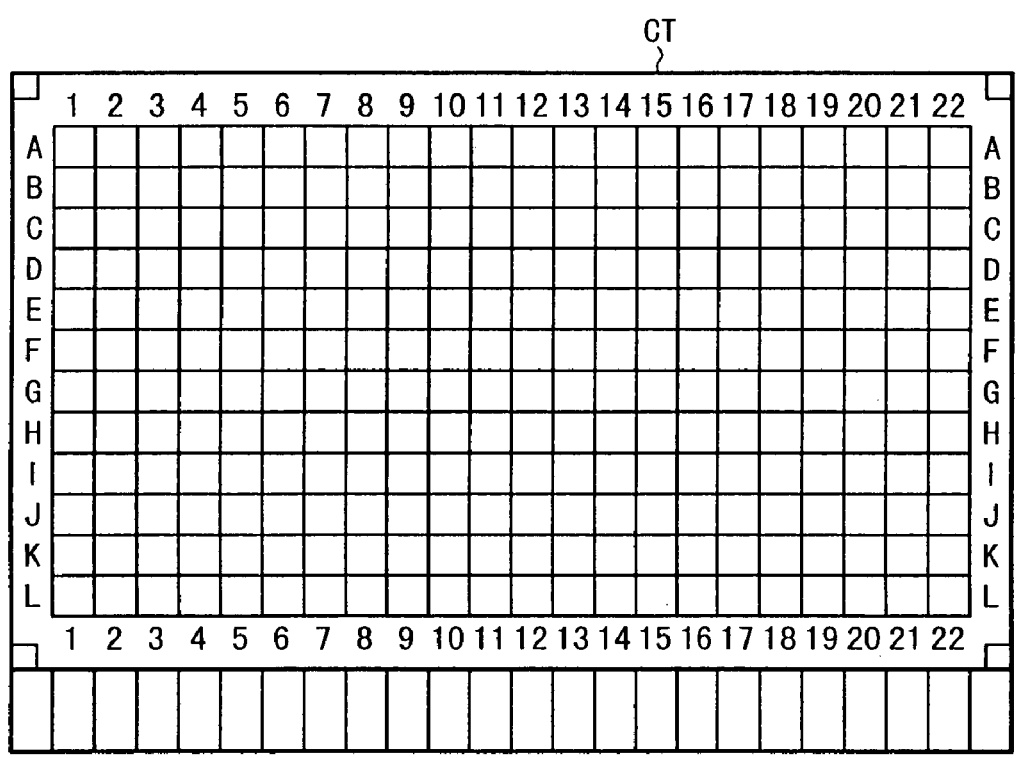
FIG. 5 is a diagram illustrative of details of an IT8 chart.

The IT8 chart CT, which is described in pages 56–59 of the literature 1, will be summarized as follows:

The IT8 chart CT as an input target is used to convert color signals from a color reversal film into device-independent signals (L*, a*, b*), and is arranged as shown in FIG. 5.

As seen from FIG. 5, the IT8 chart CT has 144 color solid colors in lines A–L and columns 1–12, primary color scales of C, M, Y, K, R, G, B in lines A–L and columns 13–19, manufacturer's inherent colors in lines A–L and columns 20–22, and a lower gray scale of 22 steps. The color solid colors in the columns 1–12 are colors selected substantially uniformly from a common color solid which is common to various real color reversal films.

The primary color scales in the columns 13–19 are determined as follows: Gray densities ranging from minimum to maximum densities are equally divided, producing a K scale. The K scale is divided to determine primary color scales of C, M, Y. These primary colors are superposed in combinations of two to determine primary colors of R (=M+Y), G (=Y+C), B (=C+M).

In the present embodiment, image signals (R, G, B) (hereinafter also referred to as "R, G, B values") which are device-dependent image signals representing the color patches of a total of 288 colors of the IT8 chart CT are determined by scanning and reading the IT8 chart CT with the scanner 14.

In step S2, the image signals (R, G, B) produced by the scanner 14 are supplied to the one-dimensional LUTs 16, 18, 20, which generate image signals (Ca, Ma, Ya), image signals (Cb, Mb, Yb), and image signals (Cc, Mc, Yc), respectively, that are supplied to the table selecting calculator 22.

In step S3, the target generator 24 determines block dye density values (C', M', Y') from calorimetric value signals (X, Y, Z) of the patches attached to the IT8 chart CT, and supplies the determined block dye density values (C', M', Y') as target values to the table selecting calculator 22.

A process of determining the block dye density values (C', M', Y') from colorimetric value signals (X, Y, Z) of the patches attached to the IT8 chart CT in step S3 will be described in detail below with reference to FIG. 6.

For determining the block dye density values (C', M', Y') from calorimetric value signals (X, Y, Z), it is necessary to know the values of the elements Xr, Xg, Xb, Yr, Yg, Yb, Zr, Zg, Zb of the left matrix on the right side of the equation (7) {the equation (5)}. Specifically, the equations (5) and (7) can be modified respectively into the following equations (12) and (11).

$$\begin{bmatrix} R \\ G \\ B \end{bmatrix} = \begin{bmatrix} X_r & X_g & X_b \\ Y_r & Y_g & Y_b \\ Z_r & Z_g & Z_b \end{bmatrix}^{-1} \begin{bmatrix} X \\ Y \\ Z \end{bmatrix} \quad (11)$$

$$\begin{bmatrix} 10^{-c} \\ 10^{-m} \\ 10^{-y} \end{bmatrix} = \begin{bmatrix} X_r & X_g & X_b \\ Y_r & Y_g & Y_b \\ Z_r & Z_g & Z_b \end{bmatrix}^{-1} \begin{bmatrix} X \\ Y \\ Z \end{bmatrix} \quad (12)$$

When the colorimetric value signals (X, Y, Z) are substituted in the equation (12), block dye density values (c, m, y) on the left side of the equation (12) can be determined from the equation (12).

As described above, in order to determine the values of the elements Xr, Xg, Xb, Yr, Yg, Yb, Zr, Zg, Zb of the matrix, stated otherwise, in order to determine block dye density values (block dye density scale), it is necessary to determine imaginary primary colors R, G, B.

Figure 6:
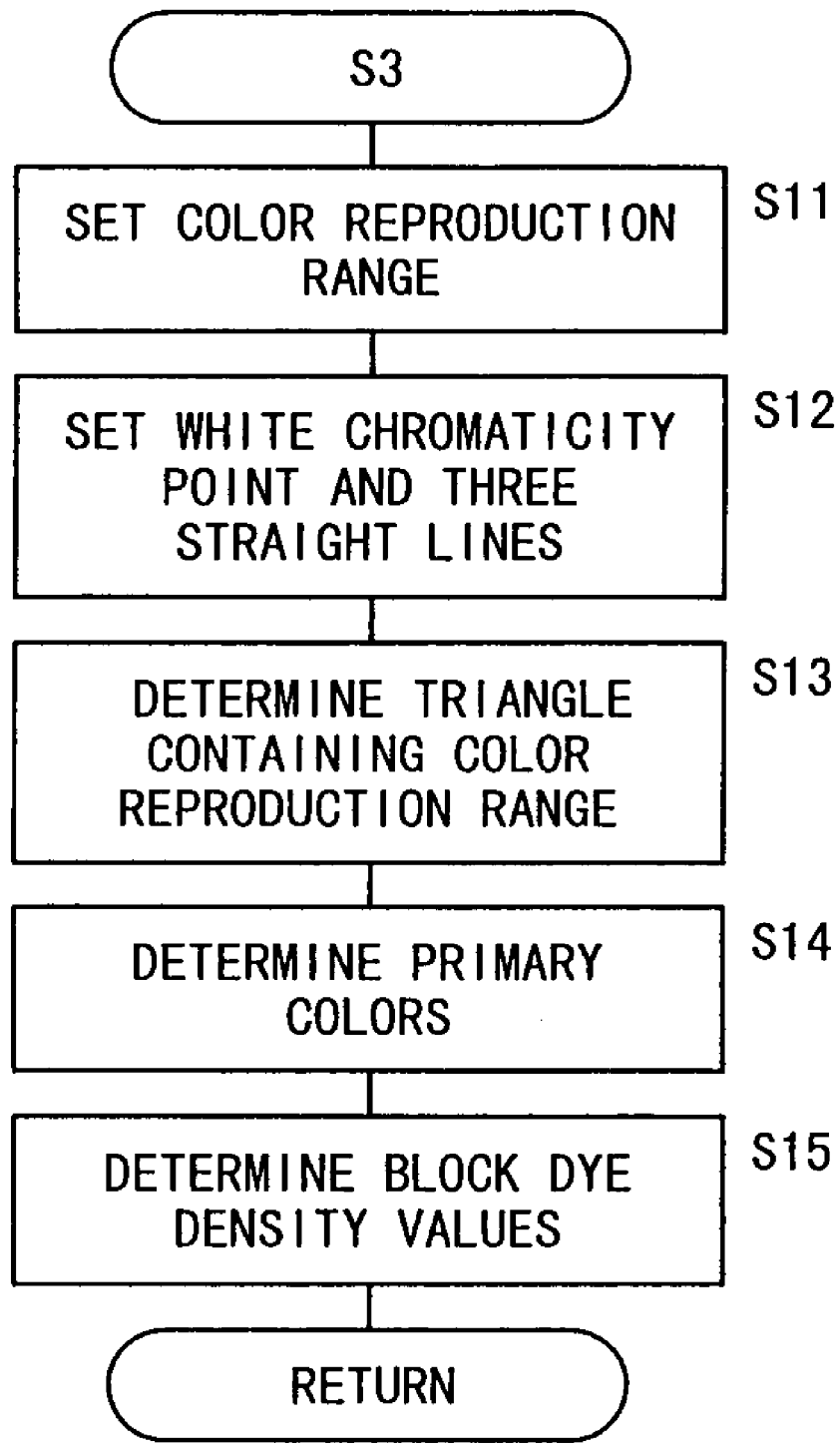
FIG. 6 is a flowchart of an operation sequence of a process of determining a block dye density.
Figure 7:
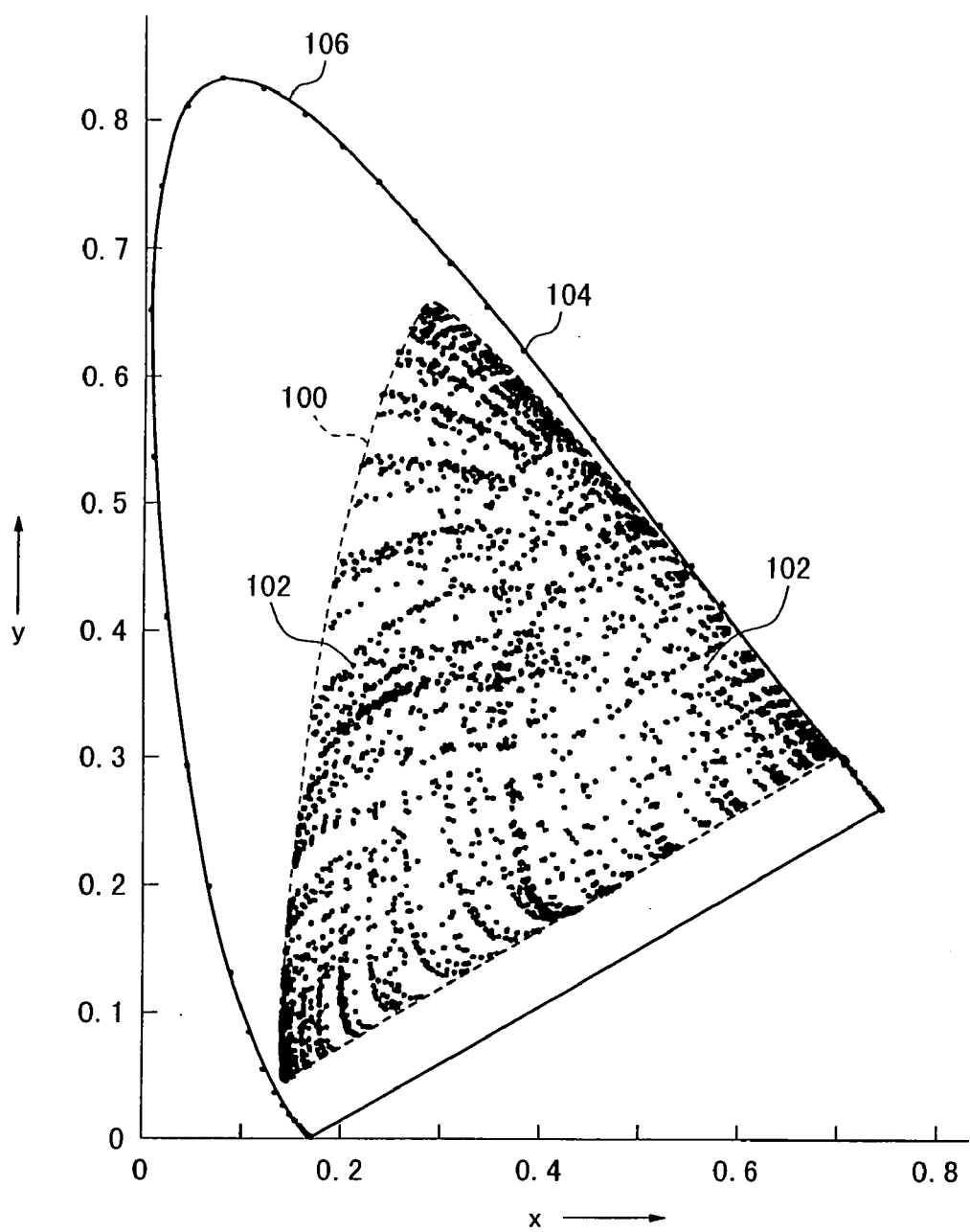
FIG. 7 is a chromaticity diagram illustrative of a color reproduction range of a color reversal film.

In a process of setting a color image color reproduction range in step S11 shown in FIG. 6, a color reproduction range 100 of the color reversal film 12 is set or plotted which is enclosed by a dotted line on the xy chromaticity diagram according to the CIE, as shown in FIG. 7. Plotted points 102 in the color reproduction range 100 are points where a color chart having a maximum number of (e.g., 3375) color patches that can be expressed as colors on a color reversal film was measured by the applicant of the present invention with a calorimeter. It is preferable to measure the color chart at many points in the vicinity of principal wavelengths, stated otherwise, those wavelengths including the colors R, G, B and their complementary colors C, M, Y, for the purpose of setting block dye density values with greater accuracy. As well known in the art, an x chromaticity value is calculated from the colorimetric values X, Y, Z measured by the colorimeter according to $x=X/(X+Y+Z)$, a y chromaticity value is calculated from the colorimetric values X, Y, Z according to $y=Y/(X+Y+Z)$, and z chromaticity value is calculated from the calorimetric values X, Y, Z according to $Z=1-x-y=Z/(X+Y+Z)$.

In FIG. 7, the range of an envelope formed by plotted points 104 measured by the applicant represents an actually existing color range 106.

Figure 8:
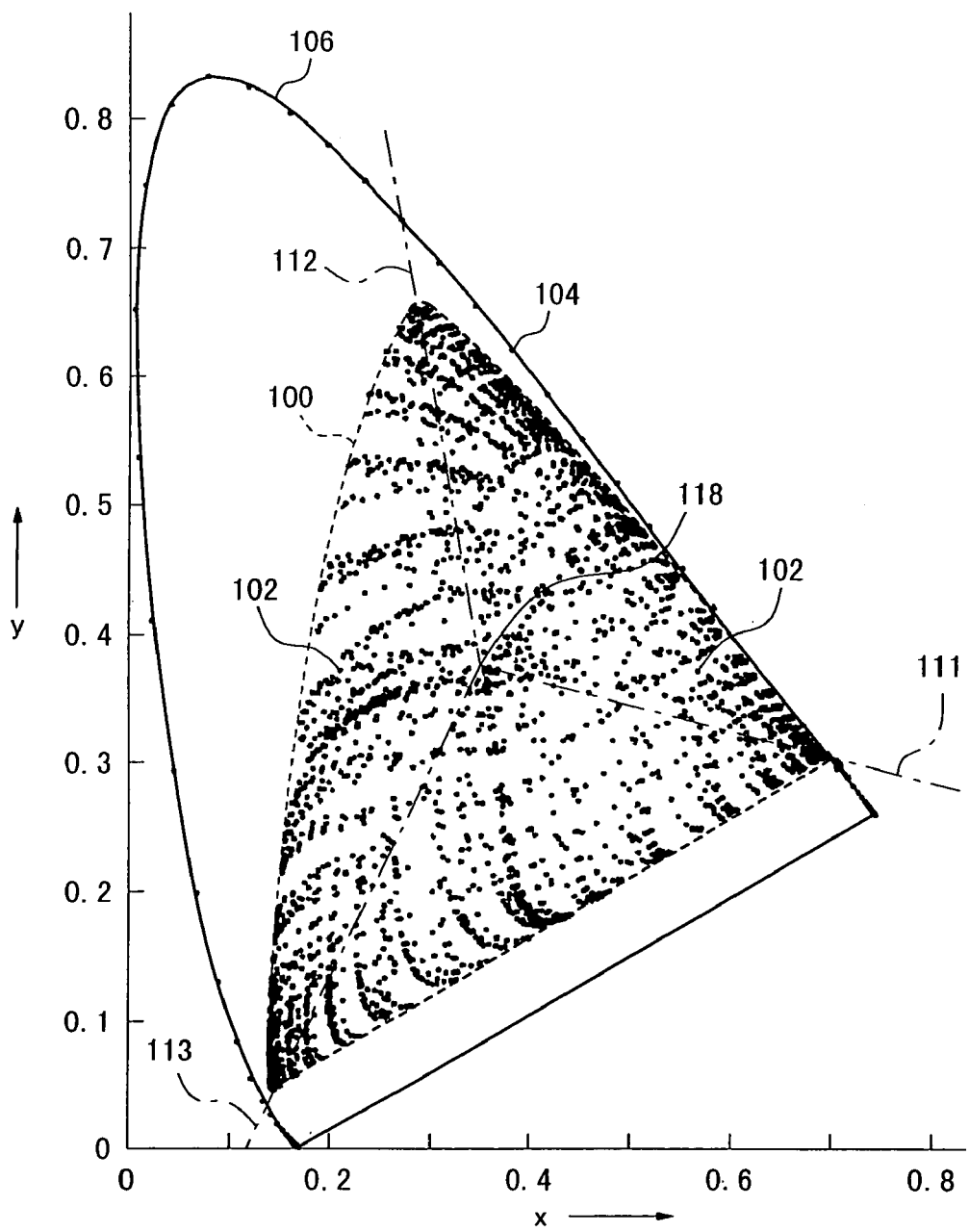
FIG. 8 is a chromaticity diagram illustrative of a process of three straight lines.

In a process of setting straight lines in step S12, as shown in FIG. 8, a chromaticity point 118 corresponding to a standard white illuminant is set or plotted on the xy chromaticity diagram, and three straight lines 111, 112, 113 are established which extend outwardly from the chromaticity point 118 and pass through the principal wavelengths relative to the primary colors in the color reproduction range 100 set in step S11. In the present embodiment, a chromaticity value (x, y)=(0.3457, 0.3586) of a supplementary standard illuminant $D_{50}$ according to the CIE is used as the standard white illuminant. Thus, in FIG. 8, the coordinates of the chromaticity point 118 are represented by (x, y)=(0.3457, 0.3586).

Figure 9:
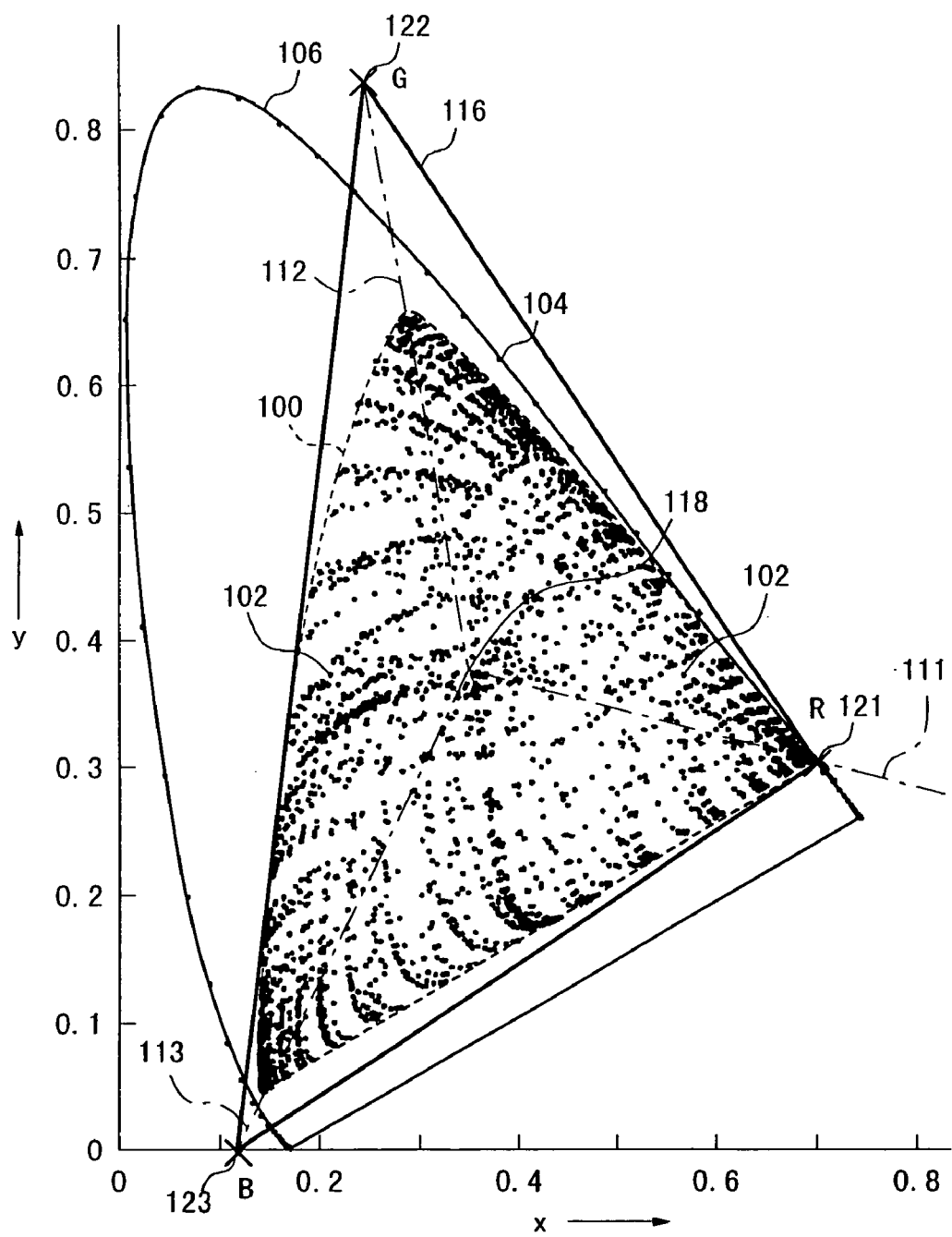
FIG. 9 is a chromaticity diagram illustrative of a process of determining the vertexes of a triangle.

In a process of determining the vertexes of a triangle containing the color reproduction range in step S13, as shown in FIG. 9, vertexes 121, 122, 123 of a triangle 116 containing the color reproduction range 100 of the color reversal film are determined on the three straight lines 111, 112, 113. If the triangle 116 containing the color reproduction range 100 is of a size such that the area of the triangle 116 is as small as possible or minimum, then the accuracy of approximation is increased.

In a process of determining primary colors in step S14, xy chromaticity values of the vertexes 121, 122, 123 of the triangle 116 are read from the chromaticity diagram shown in FIG. 9, and determined as chromaticity values of imaginary primary colors R, G, B. The imaginary primary colors R, G, B are involved because the chromaticity values of the imaginary primary colors R, G are present outside the actual color range 106.

By substituting the values of the primary colors R, G, B for $R=10^{-c}$, $B=10^{-m}$, $G=10^{-y}$ in the equation (6), density values c, m, y of the block dyes in the equation (6) are calculated.

If the values of the primary colors R, G, B are determined as xy chromaticity values, then density values c, m, y of the block dyes can be calculated according to the equations of $z=1-x-y$, $x=X/(X+Y+Z)$, $y=Y/(X+Y+Z)$ and the equation (12).

Based on the chromaticity values of the primary colors R, G, B determined in step S14 and the chromaticity value of $D_{50}$, values of the elements $R_X$, $R_Y$, $R_Z$, $G_X$, $G_Y$, $G_Z$, $B_X$, $B_Y$, $B_Z$ of the left matrix on the right side of the equation (8) are determined. As described above with respect to the equations (9) and (10), the elements Xr, Xg, Xb, Yr, Yg, Yb, Zr, Zg, Zb of the left matrix on the right side of the equation (7) can be determined, and hence values of the left inverse matrix on the right side of the equation (12) can be determined.

With the equation (12) set in the target generator 24, it is possible to determine block dye density values (C', M', Y') from the colorimetric values (X, Y, Z) of the patches attached to the IT8 chart CT, and supply the determined block dye density values (C', M', Y') as target values to the table selecting calculator 22, in step S3.

In step S4, the table selecting calculator 22 performs a regression analysis. In the regression analysis, the relationship between the input values (Ca, Ma, Ya), (Cb, Mb, Yb), (Cc, Mc, Yc) as device-dependent image signals and the above target values (C', M', Y'), i.e., the block dye density values as device-dependent image signals, is expressed by a polynomial according to the following equation (13):

$$C'a(Ca, Ma, Ya) = \sum_{i=0}^{n}\sum_{j=0}^{i}\sum_{k=0}^{i-j} A_{jk(i-j-k)} Ca^j Ma^k Ya^{(i-j-k)} \quad (13)$$

In the equation (13), the target value C' corresponding to the input values (Ca, Ma, Ya) is expressed as C'a(Ca, Ma, Ya). Similarly, in the description which follows, target values M', Y' corresponding respectively to the input values (Cb, Mb, Yb), (Cc, Mc, Yc) are expressed as M'a (Cb, Mb, Yb), Y'a (Cc, Mc, Yc), respectively.

In the equation (13), $A_{jk(i-j-k)}$ represents a coefficient, and n represents the degree of the polynomial and is determined depending on the required accuracy. In the present embodiment, the degree n is n=7.

The equation (13) can be developed in the following equation (14):

$$C'a(Ca, Ma, Ya) = A_{000} + A_{001}Ya + A_{010}Ma + A_{100}Ca + A_{002}Ya^2 + A_{011}MaYa + A_{020}Ma^2 + A_{101}CaYa + A_{110}CaMa + A_{200}Ca^2 + \ldots \quad (14)$$

The target values M', Y' can also be expressed according to similar equations.

For reasons of convenience, the equation (14) is replaced with the following equation (15):

$$C'a(Ca, Ma, Ya) = B_0 + B_1Ya + B_2Ma + B_3Ca + B_4Ya^2 + B_5MaYa + B_6Ma^2 + B_7CaYa + B_8CaMa + B_9Ca^2 + \ldots \quad (15)$$

In order to effect a regression analysis on the equation (15), the equation (15) is replaced with the following equation (16) where the number of terms of the polynomial is set to n' $\{n'=(n+1)(n+2)(n+3)/6=(8\times9\times10)/6=120\}$, C'a is regarded as an object variable, Xm (m=0, 1, . . . , n'-1) as explanatory variables, and Bm (m=0, 1, . . . , n'-1) as coefficients:

$$C'a(Ca, Ma, Ya) = B_0X_0 + B_1X_1 + \ldots + BmXm + \ldots + Bn'-1Xn'-1 \quad (16)$$

A matrix equation for effecting a regression analysis on the object variable C'a with respect to all the 288 patches of the IT8 chart CT is expressed by the equation (17) shown below. In the equation (17), a regression analysis is effected on object variables C'a$_0$, C'a$_1$, . . . , C'a$_m$, . . . , C'a$_{287}$ corresponding to all the patches of the IT8 chart CT, thereby determining the coefficients Bm (m=0, 1, . . . , n'−1).

$$\begin{bmatrix} C'a_0 \\ C'a_1 \\ \vdots \\ \vdots \\ \vdots \\ C'a_{287} \end{bmatrix} = \begin{bmatrix} X_{00} & X_{10} & \cdots & Xn'-1_0 \\ X_{00} & X_{11} & \cdots & Xn'-1_1 \\ \vdots & \vdots & \vdots & \vdots \\ \vdots & \vdots & \vdots & \vdots \\ \vdots & \vdots & \vdots & \vdots \\ X_{0287} & X_{1287} & \cdots & Xn'-1_{287} \end{bmatrix} \begin{bmatrix} B_0 \\ B_1 \\ \vdots \\ \vdots \\ Bn'-1 \end{bmatrix} \quad (17)$$

If the coefficients Bm are determined, then the regression analysis in step S4 is finished.

After the coefficients Bm are determined, the table selecting calculator 22 determines a conversion formula, i.e., a polynomial, for converting the input values (Ca, Ma, Ya) into target values (C'a, M'a, Y'a) according to the equations (15), (16). The polynomial uses the linear conversion table 16 as a one-dimensional LUT.

Similarly, the table selecting calculator 22 determines a conversion formula (polynomial) for converting the input values (Cb, Mb, Yb) into target values (C'b, M'b, Y'b) and a conversion formula (polynomial) for converting the input values (Cc, Mc, Yc) into target values (C'c, M'c, Y'c) using the remaining conversion tables, i.e., the logarithmic conversion table 18 and the luminance logarithmic conversion table 20, each as one-dimensional LUT.

In step S6, target values (C'a, M'a, Y'a), (C'b, M'b, Y'b), (C'c, M'c, Y'c) are calculated with respect to the input values (Ca, Ma, Ya), (Cb, Mb, Yb), (Cc, Mc, Yc) according to the equation (14) whose coefficient values are determined.

In step S7, the calculated target values (C'a, M'a, Y'a), (C'b, M'b, Y'b), (C'c, M'c, Y'c) are compared with the block dye density values (C', M', Y') determined as target values in step S3.

In step S8, based on the compared result, those values of the calculated target values (C'a, M'a, Y'a), (C'b, M'b, Y'b), (C'c, M'c, Y'c) which are closest on the average to the target values (C', M', Y') are selected, and one of the one-dimensional LUTs 16, 18, 20 corresponding to the selected values is determined.

In step S9, the table selecting calculator 22 switches the table selector 28 to read output image signals from one of the one-dimensional LUTs 16, 18, 20 which is determined depending on the scanner 14 as the input device, holds the coefficients Bm corresponding to the scanner 14 in the coefficient holder 26, and sets the polynomial according to the equation (15) that corresponds to the scanner 14 in the DDC/DIC converter 30.

When the scanner 14 is actually selected as the input device, the image processor 15 switches the table selector 28 based on the result of approximating calculations to select one of the one-dimensional LUTs 16, 18, 20 corresponding to the scanner 14, in response to an instruction supplied from the operator via the input device or automatically according to communications with the scanner 14, and sets the coefficients Bm, which correspond to the scanner 14, from the coefficient holder 26 in the polynomial according to the equation (15) that is set in the DDC/DIC converter 30. The image processor 15 then combines or merges the selected one-dimensional LUT, the polynomial whose coefficients Bm are set, and the color processing LUT 56 as the color processor 32 with the combined LUT generator 34, and sets the merged LUT into the combined LUT setting unit 36.

With the merged LUT thus set, it is possible to easily convert device-dependent image signals (R, G, B) outputted from the scanner 14 as the input device when a color reversal film 12 as a subject is read by the scanner 14 into device-dependent image signals (C, M, Y, K) suitable for use by a printing press as the output device.

In the present embodiment, as described above, the image processor 15 performs the input converting process of converting device-dependent image signals (R, G, B) supplied from the scanner 14 into device-dependent image signals (C, M, Y) (either one set of image signals (Ca, Ma, Ya), (Cb, Mb, Yb), (Cc, Mc, Yc)) as intermediate values using one of the one-dimensional LUTs 16, 18, 20, and thereafter converting the device-dependent image signals (C, M, Y) as intermediate values into block dye density values (C, M, Y) as device-independent image signals using the polynomial according to the equation (15) set in the DDC/DIC converter 30, and the output converting process of converting the block dye density values (C, M, Y) as device-independent image signals into device-dependent image signals (C, M, Y, K) corresponding to the output device with the color processor 32.

In the input converting process, device-dependent image signals (R, G, B) are converted into intermediate device-dependent image signals (C, M, Y) as intermediate values using one of the one-dimensional LUTs 16, 18, 20, and thereafter the device-dependent image signals (C, M, Y) as intermediate values are converted into block dye density values (C, M, Y) as device-independent image signals using the polynomial {the equation (15)} set in the DDC/DIC converter 30. Therefore, the accuracy of approximation by the polynomial is greatly increased, resulting in a large increase in the accuracy of conversion by the polynomial.

Heretofore, a large-size input profile has been needed to convert the device-dependent image signals (R, G, B) are converted into the device-independent image signals (C, M, Y). In the present embodiment which uses the polynomial, a small-size input profile may be used because coefficients Bm may be held as a profile. The accuracy of conversion may be equal to or greater than the conventional accuracy of conversion by increasing the number of terms of the polynomial.

If the input device remains the same, then it is not necessary to select one of the one-dimensional LUTs 16, 18, 20, but a single one-dimensional LUT where the value of the polynomial is most accurate may be fixedly used.

If the accuracy of conversion does not need to be substantially high or the approximation by the polynomial is highly acceptable, then the one-dimensional LUTs 16, 18, 20 may be dispensed with, and the output signal from the scanner 14 may be supplied directly to the table selecting calculator 22 and the DDC/DIC converter 30. This modification has a simpler arrangement.

In the present embodiment, the color processor 32 performs an image processing process based on the block dye density values (C, M, Y) as device-independent image signals. Therefore, the color processor 32 can utilize the image processing technique that uses density-based image signals as conventional image processing resources.

The device-independent image signals representing densities with block dyes have properties similar to conventional density values and equivalent neutral density values. Therefore, the device-independent image signals can be handled with ease, and can highly accurately be converted into colorimetric values X, Y, Z through simple calculations according to the equation (5).

In the above embodiment, the device-dependent image signals are C (cyan), M (magenta), and Y (yellow) signals. However, the device-dependent image signals may be R (red), G (green), and B (blue) signals, and the device-independent image signals may be C, M, Y signals representing densities with block dyes, so that R, G, B signals and C, M, Y signals outputted from an image input device such as a digital camera, a scanner, or the like may be handled as C, M, Y signals representing densities with block dyes.

In the above embodiment, a color reversal film is used as a medium carrying a color image. However, if a reflective color print is used, then an ANSI/IT8.7/2-1993 chart as an input color target according to the ANSI may be used.

The above process of converting image signals may be arranged as an apparatus for performing the converting process.

Figure 10:
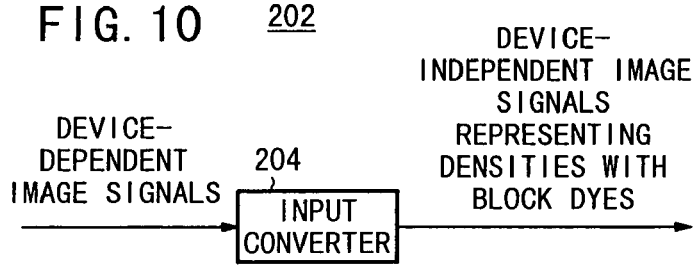
FIG. 10 is a block diagram of an apparatus for converting an image signal.
Figure 11:
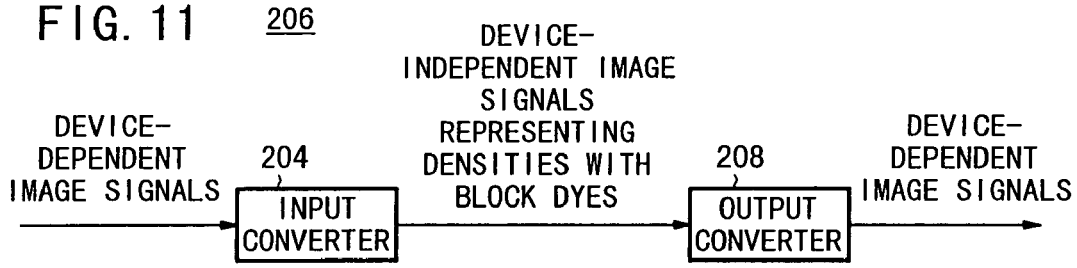
FIG. 11 is a block diagram of another apparatus for converting an image signal.
Figure 12:
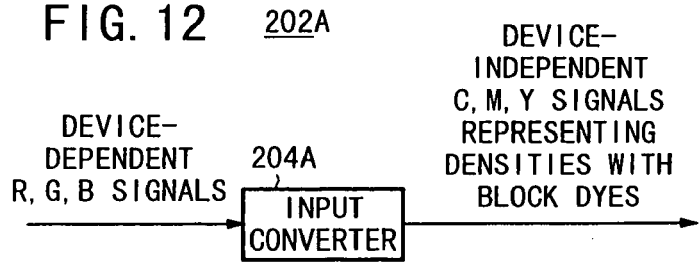
FIG. 12 is a block diagram of still another apparatus for converting an image signal.

FIGS. 10, 11, and 12 show such image signal converting apparatus 202, 206, 202A, respectively, for performing the converting process.

As shown in FIG. 10, the image signal converting apparatus 202 for converting device-dependent image signals into device-independent image signals has an input converter 204 for converting device-dependent image signals into device-independent image signals representing densities with block dyes.

As shown in FIG. 11, the image signal converting apparatus 206 has an input converter 204 for converting device-dependent image signals supplied from an input device which reads an image subject into device-independent image signals representing densities with block dyes, and an output converter 208 for converting the device-independent image signals into device-dependent image signals for an output device.

As shown in FIG. 12, the image signal converting apparatus 202A has an input converter 204A for converting device-dependent R, G, B signals device-dependent image signals representing densities with block dyes.

The input device is not limited to the scanner 14, but may be a digital camera. The output device is not limited to a printing press, but may be a printer, a CRT display, or the like.

According to the present invention, as described above, device-dependent image signals are converted into device-independent image signals representing densities with block dyes.

Since the device-independent image signals representing densities with block dyes have properties similar to conventional density values and equivalent neutral density values. Therefore, the image processing resources for processing conventional density values and equivalent neutral density values may be employed.

The device-independent image signals can therefore be easily handled by image processing engineers who have heretofore been involved in image processing tasks using conventional density values and equivalent neutral density values.

Inasmuch as the device-independent image signals representing densities with block dyes can highly accurately be converted into colorimetric values through simple calculations without the need for integral calculations, recent image processing resources that process calorimetric values can also be employed. Accordingly, color management is facilitated.

Although certain preferred embodiments of the present invention have been shown and described in detail, it should be understood that various changes and modifications may be made therein without departing from the scope of the appended claims.

What is claimed is:

1. An apparatus for converting device-dependent image signals into device-independent image signals, comprising:
   a plurality of one-dimensional conversion tables for processing device-dependent image signals supplied from an input device which reads an image subject, with respective predetermined functions;
   a table selector for selecting one of said one-dimensional conversion tables which is optimum for said input device; and
   an input converter for converting the device-dependent image signals processed by the one-dimensional conversion table which is selected by said table selector, into device-independent image signals representing densities with block dyes.

2. An apparatus according to claim 1, wherein said table selector comprises:
   means for using block dye densities determined from a reference color chart as target values;
   means for processing, as input values, image signals which are produced by reading said reference color chart with said input device and processed by said one-dimensional
   conversion tables, according to a predetermined polynomial, thereby to produce calculated values; and
   means for selecting one of said one-dimensional conversion tables which outputs said input values corresponding to those of said calculated values which are closest to said
   target values, as the one-dimensional conversion table which is optimum for said input device.

3. An apparatus according to claim 2, wherein said predetermined polynomial comprises a polynomial based on a regression analysis.

* * * * *